United States Patent [19]

Rabii

[11] Patent Number: 4,910,509
[45] Date of Patent: Mar. 20, 1990

[54] BUS EXPANDER FOR DIGITAL TV RECEIVER

[75] Inventor: Khosro M. Rabii, Arlington Heights, Ill.

[73] Assignee: Zenith Electronics Corporation, Glenview, Ill.

[21] Appl. No.: 169,564

[22] Filed: Mar. 17, 1988

[51] Int. Cl.$^4$ .............................................. H04Q 9/14
[52] U.S. Cl. ..................... 340/825.520; 340/825.070; 358/903
[58] Field of Search ..................... 358/194.1, 903, 188; 360/33.1, 51, 69; 455/151; 370/60, 58, 94, 58.1, 58.2, 58.3, 94.1–94.3; 364/200; 340/825.52, 825.59, 825.07

[56] References Cited

U.S. PATENT DOCUMENTS

| | | | |
|---|---|---|---|
| 4,608,562 | 8/1986 | Minor et al. | 340/825.59 |
| 4,649,428 | 3/1987 | Jones et al. | 358/188 |
| 4,779,093 | 10/1988 | Watkins | 340/825.57 |

Primary Examiner—Donald J. Yusko
Assistant Examiner—Warren Crummer

[57] ABSTRACT

A digital television chassis and a picture-in-picture module are interconnected with control microprocessor means via a three wire communications bus. Function control units in the digital chassis and in the picture-in-picture module have identical digital addresses. A logic circuit is interposed in the Ident line from the microprocessor and the Ident lines to each of the digital chassis and PIP module for selectively controlling the digital chassis and the PIP module. The microprocessor addresses the logic circuit and provides a Data signal indicating which of the digital chassis and PIP module is to be controlled.

7 Claims, 2 Drawing Sheets

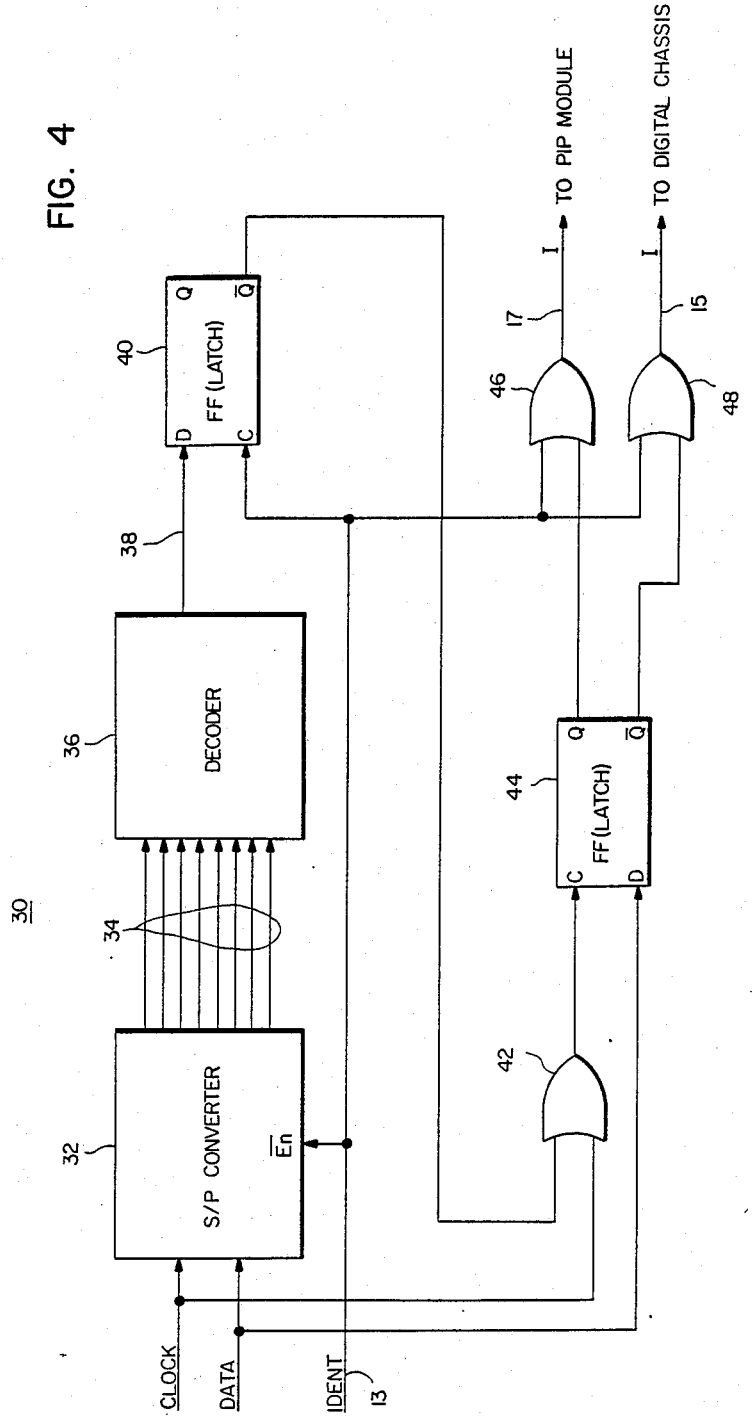

BUS EXPANDER FOR DIGITAL TV RECEIVER

BACKGROUND OF THE INVENTION AND PRIOR ART

This invention relates generally to bus communications between a microprocessor controller, or central control unit (CCU), and function control units that have identical digital addresses. More specifically, the invention is concerned with operating a television receiver (TV) having a digital chassis including a number of digitized function control units and a picture-in-picture module including digitized function control units where one or more pairs of the individual function control units have the same digital addresses.

The prior art includes so-called digital TV receivers in which digital signals and functions controls are used rather than conventional analog signals and control devices. The many advantages associated with a digital TV receiver include uniformity of product, precise control of signal parameters and operating conditions, elimination of mechanical switches and a greatly enhanced potential for reliability. Television receiver Model No. SD2035H from Zenith Electronics Corporation embodies such a digital chassis. In particular, it includes a high speed communications bus for interconnecting a CCU with various TV function modules for processing a TV signal. The modules include a deflection processing unit, a video processing unit, an automatic phase control, a video codec unit, an audio analog to digital converter, and an audio processing unit. The system and its various integrated circuit chips is generally described in DIGIT 2,000 VLSI Digital TV System developed by ITT Intermetall and published in edition 1984/85 order No. 6250-11-2E. The interconnection and general operations of the various function control units in the digital TV chassis and the so-called IM (Intermetall) bus are disclosed in U.S. Pat. No. 4,649,428, issued 3/10/87 and assigned to Zenith Electronics Corporation and which is hereby incorporated by reference.

A rapidly growing feature in TV receivers is the so-called picture-in-picture (PIP) which enables a viewer to selectively watch a different television presentation as an inset on the main television presentation. The present invention is particularly concerned with the PIP system used in a digital TV chassis such as that described in the above-mentioned '428 patent.

In the PIP system, many of the function control units are identical to those in the digital chassis. In the interest of economy, it is desirable to utilize identical (or substantially identical) integrated circuit chips to implement the PIP function. A formidable difficulty arises, however, where the IC chips in the PIP module have the same digital addresses as their counterparts in the digital chassis, since the IM bus communications system is incapable of differentiating between function control units having the same digital addresses.

Accordingly, it would be highly desirable to have a means and method of operating such an IM bus system with a plurality of function control units that have the same digital addresses.

OBJECTS OF THE INVENTION

A principal object of the invention is to provide a novel digital TV system.

Another object of the invention is to provide a method of communicating between function control units having the same digital addresses.

A further object of the invention is to provide a low cost digital TV receiver including a digital chassis and a PIP module.

BRIEF DESCRIPTION OF THE DRAWINGS

These and other objects and advantages of the invention will become apparent upon reading the following description in conjunction with the drawings in which:

FIG. 4 is a block diagram of the control logic in FIG. 3.

DESCRIPTION OF THE PREFERRED EMBODIMENT

Figure 1:
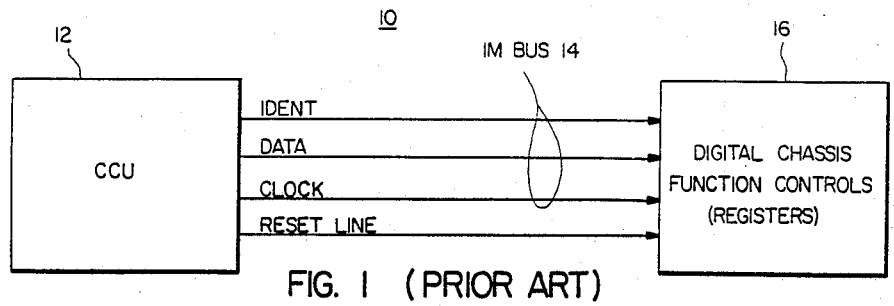
FIG. 1 is a generalized block diagram of a digital television receiver utilizing an IM bus communications system.
Figure 2:
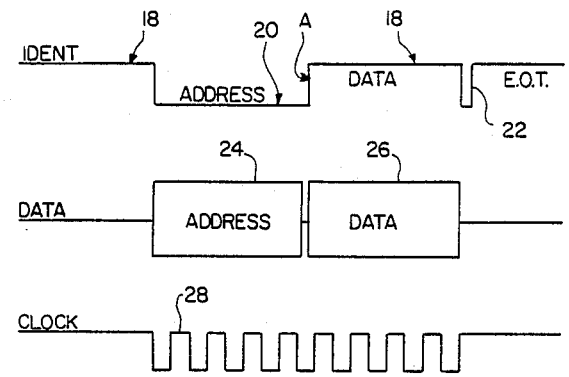
FIG. 2 is a series of waveforms depicting the communication protocol on the IM bus.

Referring to the prior art FIGS. 1 and 2, a digital TV receiver 10 includes a CCU controller or microprocessor 12 interconnected by an IM bus 14 and a reset line R to a digital chassis 16. Digital chassis 16 should be understood to include a number of function control units, each of which includes suitable registers and each of which has a unique digital address. IM bus 14 includes an Ident line, a Data line and a Clock line. As more clearly shown in FIG. 2, the signals carried on these lines, which are also identified by the names of the lines, are shown. The Ident signal has a normal level 18, a negative level 20, signalling transmission of address information, followed by an equal duration normal level 18, signalling transmission (or reception) of data, followed by an end of transmission pulse 22. The Data signal comprises address information 24 followed by data information 26. The Clock signal includes a series of clock pulses 28 for comparing the address information and for clocking the data information into the register of the selected function control unit.

In a non-operative state, all three of the lines are high. A transaction on the bus is initiated when the Ident line and the Clock line are low. Eight address bits are transferred, beginning with the least significant bit. Thereafter data transfer occurs when the positive edge of a clock pulse occurs, with the Ident line being high, as indicated at A. The IM bus system is designed for economy and the peripheral function control units operate as slaves which eliminates priority problems on the bus. Address comparisons in the slave circuits occur, and if there is a match, the IM bus interface switch (not shown) in the addressed function control unit switches to a Read or Write function. (Since the individual function control unit either reads or writes data, but not both, the actual Read or Write function may be correlated to the function control unit address.) The Clock line is clocked to serially read, or write, the data bits from or to the selected register and a completion of a bus transaction is signalled by the end of transmission pulse 22 on the Ident line. The end of transmission pulse tells the appropriate bus interface unit to store the transfer data. For clarity, and since the invention is not concerned with these operations, none of the function control units is shown. The invention is solely concerned with the method of communicating with these units.

Figure 3:
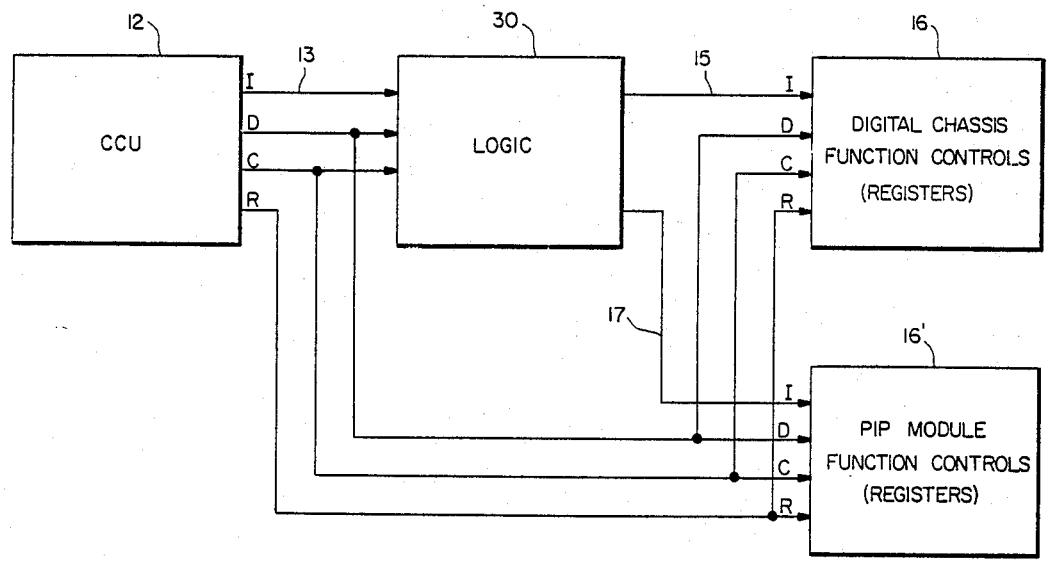
FIG. 3 is a simplified block diagram of the invention.

In FIG. 3, CCU 12 is interconnected with a digital chassis 16 and a PIP module 16' in accordance with the invention. Specifically, a control logic circuit 30 is interposed in the Ident line 13 from CCU 12 and supplies an Ident line 15 to chassis 16 and an Ident line 17 to PIP module 16'. The Data and Clock lines from CCU 12 are supplied to each of control logic 30, digital chassis 16 and PIP module 16'. CCU 12 supplies address information via the Data and Clock lines. Control logic 30 is assigned a unique digital address that is different from any other address in the system. When CCU 12 addresses control logic 30, the address information is also supplied to digital chassis 16 and PIP module 16', but they do not respond. (More specifically, none of the function control units in digital chassis 16 and PIP module 16' respond.) CCU 12 also supplies a Data signal to control logic 30 to instruct control logic 30 as to which of the Ident lines 15 and 17 is to be enabled and which is to be disabled. The control logic in effect acts as a switch to select digital chassis 16 or PIP module 16' to respond to the addressed commands from CCU 12.

FIG. 4 discloses control logic circuit 30. As mentioned, transmission of data on the IM bus is serial and a serial to parallel (S/P) converter 32 is provided for converting the address information to parallel form and supplying it on eight output lines 34. Output lines 34, each of which represents a bit, are coupled to a decoder 36 which responds to the address bits on output lines 34 to generate a logic high output only when control logic 30 is addressed. This output is provided on a line 38 that is connected to the D input of a flip-flop latch 40. The Ident line 13 from CCU 12 is coupled to the enable input of S/P converter 32, to the clock input of flip-flop 40 and to a first input of each of a pair of OR gates 46 and 48, which comprise Ident line enabling means. The $\overline{Q}$ output of flip-flop 40 is connected to one input of an OR gate 42, the other input of which is connected to the Clock line. OR 42 functions as a Clock signal enabling means and its output is connected to the clock input of another flip-flop latch 44, the D input of which is connected to the Data line. The Q output of flip-flop 44 is connected to the other input of OR 46 and its $\overline{Q}$ output is connected to the other input of OR 48. The output of OR 46 is Ident line 17, which is connected to PIP module 16', and the output of OR 48 is Ident line 15, which is connected to digital chassis 16.

In operation, CCU 12 addresses control logic 30 via the Data line. The serial address information is converted to parallel form by S/P converter 32 and decoded by decoder 36 which develops a high logic level signal at the D input of flip-flop 40. At the positive-going edge of the Ident signal 13 (indicated as A in FIG. 2), flip-flop 40 is clocked and the high logic level signal on its D input is transferred to its Q output. $\overline{Q}$ of flip-flop 40 goes to a low logic level and enables OR 42, thus permitting clock pulses on the Clock line to pass to the clock input of flip-flop 44. CCU 12 now supplies a Data signal that consists of pulses that are either high or low depending on which one of digital chassis 16 and PIP module 16' is to be communicated with. Assuming the Data line is low, the Q output of flip-flop 44 goes low and OR 46 is enabled. At the same time, the $\overline{Q}$ output of flip-flop 44 goes high and OR 48 is disabled. OR 48 being disabled applies a high level signal on Ident line 15 which precludes communication with digital chassis 16. Thus, none of the function control units in digital chassis 16 will respond to any address or data information placed on the IM bus by CCU 12. OR 46, on the other hand, is enabled and Ident line 17, which is connected to the PIP module 16' will pass the Ident signal 13 from CCU 12. Consequently, each of the function control units in PIP module 16' will respond in the normal way to the address information on the IM bus and to any data information that is addressed to it. It will be appreciated that the latching arrangement described maintains communication between CCU 12 and the selected one of digital chassis and PIP module 16' until a change is made by CCU 12 sending a new Data signal to control logic 30. In this manner, function control units with identical digital addresses may be individually controlled on the IM bus without confusion.

In practice, the control logic 30 and associated apparatus, including PIP module 16' and required memories may be placed on a single plug-in card in the digital television receiver. With that approach, the manufacturer can offer the PIP feature as an option with minimal cost impact on a digital TV receiver not having the feature.

It is recognized that numerous modifications and changes in the described embodiment of the invention will be apparent to those skilled in the art without departing from its true spirit and scope. The invention is to be limited only as defined in the claims.

What is claimed is:

1. A method of operating a communication system having a microprocessor controller linked to first and second function control units via a communications bus that includes a Clock line, a Data line and an Ident line, with the Data line supplying serial address information and serial data information to the first and second function control units, both of the first and second function control units having identical digital addresses, comprising the steps of:

providing logic control means, having a unique digital address, in communication with the communications bus and interposed between the Ident line from the controller and the Ident lines to the first and second function control units;

addressing the logic control means over the Clock and Data lines and supplying, to the logic control means, a Data signal indicating which of the first and second function control units is to be controlled by the controller; and enabling the Ident line between the logic control means and the one of the first and second function control units that is to be controlled and disabling the Ident line between the logic control means and the other function control unit.

2. The method of claim 1 wherein the logic control means includes latch means and Ident line enabling means and further including the step of:

controlling the Ident line enabling means with the latch means and the Data signal.

3. The method of claim 2 wherein the logic means includes serial to parallel converter means and decoder means for receiving and decoding the unique digital address.

4. The method of claim 3 wherein the latch means include a first flip-flop latch coupled to the output of the decoder means and a second flip-flop latch, controlled by the first flip-flop latch and by the Data signal.

5. In combination:

first and second function control units having identical digital addresses;

microprocessor means for serially transmitting address and data information to said first and to said second function control means;

a communications bus interconnecting said microprocessor and said first and said second function control means, said communications bus including an Ident line, the voltage level of which enables identification of address information and data information; and logic means, having a unique digital address, interposed between the Ident line from said microprocessor means and the Ident lines to said first and to said second function control means, said logic means selectively enabling the Ident line to one of said first and said second function control means and disabling the Ident line to the other of said first and said second function control means, under control of said microprocessor means.

6. The combination of claim 5 wherein said logic means includes latch means for maintaining the enabled one of said Ident lines enabled and the disabled one of said Ident lines disabled.

7. The combination of claim 6 wherein said logic means includes:

a serial to parallel converter and a decoder for receiving and decoding said unique address; and flip-flop means for enabling said latch means upon decoding said unique address.

* * * * *